United States Patent [19]

Mizglewski

[11] Patent Number: 5,356,293

[45] Date of Patent: Oct. 18, 1994

[54] SEXUALLY-TRANSMITTED DISEASE AWARENESS PROGRAM PACKAGE

[76] Inventor: Joseph Mizglewski, P.O. Box 85, Belford, N.J. 07718

[21] Appl. No.: 76,423

[22] Filed: Jun. 14, 1993

[51] Int. Cl.⁵ .............................................. G09B 19/00
[52] U.S. Cl. .................................... 434/236; 434/433
[58] Field of Search ................. 206/69, 449, 232, 581, 206/38; 434/236, 433, 262; 446/147

[56] References Cited

U.S. PATENT DOCUMENTS

| | | |
|---|---|---|
| 3,958,690 | 5/1976 | Gee, Sr. .............................. 206/38 X |
| 4,741,434 | 5/1988 | Liebman ................................ 206/38 |
| 4,834,240 | 5/1989 | Dagostine ............................ 206/459 |
| 4,925,033 | 5/1990 | Stoner ................................ 206/69 X |
| 4,969,821 | 11/1990 | Smith .................................. 434/433 |

*Primary Examiner*—Gene Mancene
*Assistant Examiner*—Jeffrey A. Smith
*Attorney, Agent, or Firm*—Charles I. Brodsky

[57] ABSTRACT

A sexually-transmitted disease awareness program utilizing a series of collector trading cards including some on which pictured celebrities express their views on "safe sex", and others on which educational facts about sex are provided, with both types being accompanied by a condom, and with all being available for distribution in a non-obtrusive wax or foil protective package.

8 Claims, No Drawings

SEXUALLY-TRANSMITTED DISEASE AWARENESS PROGRAM PACKAGE

FIELD OF THE INVENTION

This invention relates to sexually-transmitted diseases and, more particularly, to an awareness program which is, at the same time, educational, protective, and challenging.

BACKGROUND OF THE INVENTION

As is well known and understood, an increasing need exists for sex-education programs in the schools. However, tax monies to finance these programs are hard to come by. The problem will be seen to be compounded in the junior high schools and high schools where the students begin more-and-more to experiment with sex.

As is also well known and understood, perhaps the greatest medical danger to society today concerns the Acquired Immune Deficiency Syndrome (AIDS) disease. Extensive research on an international scale has been implemented in an attempt to combat the spread of the disease, and in an attempt to find its cause and to develop a cure. Private foundations—many sponsored by celebrities in the Entertainment and Sports worlds—have been formed to join in the research and to disseminate information as to those practices which minimize the possibility of being affected by the disease. Proponents of such AIDS research identify themselves, typically, through the wearing of "red ribbons" about their visible clothing.

As is also well known and appreciated, a relatively new industry that has sprung up in the United States concerns the collecting of trading cards; whereas originally associated primarily with athletics—in which cards were packaged with a stick of bubble gum and sold to youngsters—now an industry has developed where more and more diversified collections of sports and non-sports cards are about—usually sold without any bubble gum—and purchased, held and traded as investment opportunities. Such collecting of trading cards will be appreciated to be a "challenging" pastime, as one tries to determine what cards, and what sets, will appreciate the most over time.

Realizing that the use of public funds to promote awareness of AIDS and other sexually-transmitted diseases is waning because of a decrease in the monies available for such purposes, and realizing the great interest that youngsters have in acquiring collections of trading cards of their Sports idols, it is an object of the present invention to somehow merge together these concepts so as to provide some manner of disseminating information concerning AIDS and other sexually-transmitted diseases to young people of school ages, with less emphasis on the need for public spending, and in a way which would gain the acceptance of the youngsters in obtaining such information.

Because of the prevalence of teenage sexual experimentation, it is also an object of the invention to further merge the dissemination of such information with a means to carry it through in actual, real-world use and experience.

It is a further object of the invention to implement such an awareness program utilizing these techniques, and taking advantage when sums of money are available for education through private foundations set up for these purposes.

SUMMARY OF THE INVENTION

As will become clear hereinafter, the sexually-transmitted disease awareness program of the invention utilizes a series of collector trading cards including some on which pictured celebrities express their views on "safe sex" and others on which educational facts about sex is provided—and with both types being accompanied by a condom, and with all being available for distribution in a non-obtrusive wax or foil protective package. In accordance with the invention, the pictured celebrities may be from the entertainment or athletic world because of the ready recognition of them by young people. To make the collection of these trading cards challenging, individually selected ones of them are intended to be autographed by the pictured celebrities, so as to make them more valuable than others not so signed, so as to appeal to the investor, as well as to provide a challenge to the younger ones in obtaining a complete set.

DETAILED DESCRIPTION OF THE INVENTION

In accordance with the invention, the sexually-transmitted disease awareness program may take the form of packaging ten collector trading cards in a single wax or foil protective package. Of the ten cards, individual ones may incorporate pictured celebrities on the front side, who express their views on safe sex on the back side. As is well known and understood, many of these celebrities in the Entertainment and Sports worlds have, in the past, and/or in the present, lent their names to private Foundations espousing various "causes'-'—many of which are concerned with AIDS awareness. As part of such package of trading cards, moreover, other cards are included as containing educational facts about sex—such as "AIDS facts", the existence of various contraceptive methods and their use, how to deal with sexual situations one might encounter in the schools, at parties, or on dates—and/or with other matters previously handled by the schools, but becoming less accessible as funding for such programs decrease. Packaged with a condom in a non-obtrusive wax or foil wrap, it will be appreciated that teenagers—and even those of pre-teenage years—will seek to collect these trading cards packages not only because of the educational information imparted, but because of the attractiveness of collecting the pictured celebrity cards of people they look up to and recognize as being foremost in their respective fields of undertaking.

As will also be understood, because of the "reach" such awareness programs may have to those who need it the most, analysis has shown that private Foundations will be receptive to contributing to the formulation of the program and distribution of it, and making available the myriad amount of information they already possess concerning sexually-transmitted disease for incorporation as part of the educational cards provided within the package. As a way of "hitting-home", the awareness program of the invention also envisions the providing of memorialization cards as part of the distribution of the awareness program, in remembering those who have passed away from the AIDS disease, or from other sexually-transmitted illnesses, both "celebrities" and "non-celebrities", as adults, teenagers and children.

In accordance with the invention—and so as to make the program more challenging to the young, and more like the trading card activities of which they have already been exposed through the use of "baseball cards", "basketball cards", "football cards", etc.—one feature of the distributional scheme for the sexually-transmitted disease awareness program envisions the packaging of individual ones of these collector trading cards randomly selected from a complete set of picture celebrity cards—making the trading of them by youngsters accessible, and the distribution of educational fact cards more widespread, as increased numbers of such "fact cards" can be distributed along with a finite set of "pictured celebrity cards". At the same time—and for purposes more of "financial investment"—a further aspect of the invention envisions the distribution of a complete set of the "pictured celebrity cards" but with "educational fact cards" conveying different information selected from an available grouping.

In either instance, randomly selected "celebrity picture cards" can be personally autographed to make them more valuable upon being detected in a package purchased by a parent for his or her child, or otherwise disseminated by a public or private agency as a public service.

While there have been described what are considered to be preferred embodiments of the present invention, it will be readily appreciated by those skilled in the art that modifications can be made without departing from the scope of the teachings herein. Thus, while the invention has been described in the context of, perhaps, packaging ten cards and a condom for use in a protective foil wrap, any numbers of desired cards could be incorporated within the package, and with any desired ratio of "celebrity picture cards" and "educational fact cards", and with or without any additional enclosures. While the type of protective package need not be of "wax" or "foil", the pairing of cards with a condom will be seen to be both a manner of disseminating information concerning "safe sex" and affording a means of carrying out such teachings in minimizing the transmittal of disease by sexual contact. For at least such reasons, therefore, resort should be had to the claims appended hereto for a true understanding of the scope of the invention.

I claim:

1. A sexually-transmitted disease awareness program package, said package comprising:

a series of collector trading cards, said series including a first plurality of cards, each of said first plurality of cards having a celebrity pictured on a first side, and said celebrity's own, personal views on "safe sex" expressed on an opposite, second side, and a second plurality of cards having educational facts about sex provided thereon; and a sealed condom; wherein said first plurality of cards, said second plurality of cards, and said sealed condom are contained within a protective wrapping.

2. The package of claims 1, wherein said collector trading cards picture celebrities from the entertainment world.

3. The package of claim 1, wherein said collector trading cards picture celebrities from the sports world.

4. The package of claim 1, wherein selected ones of said collector trading cards include autographs of said celebrities whose pictures appear thereon.

5. The package of claim 1, wherein said collector trading cards picture celebrities and their expressions of views on AIDS awareness.

6. The package of claim 5, wherein said collector trading cards also include cards printed with pictures of celebrities who have passed away from the AIDS disease.

7. The package of claim 5, wherein said collector trading cards also include cards printed with pictures of people in the general population, including groups such as teenagers and children, who have passed away from the AIDS disease.

8. The package of claim 1, wherein said package includes individual ones of collector trading cards picturing celebrities randomly selected from a complete set of pictured celebrities cards.

* * * * *